Figure 1:
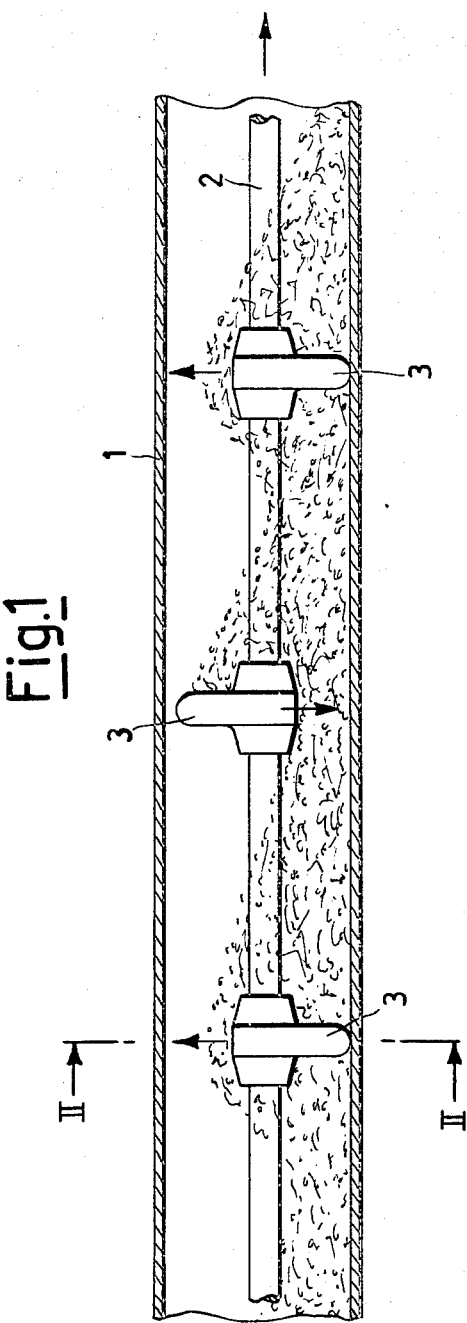

United States Patent [19]
Pirovano

[11] 3,889,799
[45] June 17, 1975

[54] CONVEYING APPARATUS FOR GRANULAR MATERIALS

[76] Inventor: Camillo Pirovano, Via Spluga, Cernusco Lombardone, Italy

[22] Filed: Nov. 26, 1973

[21] Appl. No.: 419,051

[30] Foreign Application Priority Data
Dec. 20, 1972 Italy .................................. 33307/72

[52] U.S. Cl. ............................................. 198/168
[51] Int. Cl. ........................................... B65q 19/08
[58] Field of Search .................... 198/168, 169, 172

[56] References Cited
UNITED STATES PATENTS
2,322,485  6/1943  Strube ................................. 198/168
2,438,083  3/1948  Whitney .............................. 198/168
3,216,553  11/1965  Leach .................................. 198/168

*Primary Examiner*—James B. Marbert
*Attorney, Agent, or Firm*—Stevens, Davis, Miller & Mosher

[57] ABSTRACT

A conveying apparatus for granular materials is disclosed, of the kind in which a cable drives within a guideway a number of conveying padlike members fastened to the cable, the improvement consisting in the fact that the conveying members do not occupy, with their periphery, the entire periphery of the guideway and, in addition, the conveying members are angularly shifted every one from its next. By so doing, jamming of the mechanism due to granules of material becoming wedged between the periphery of the conveying members proper and the guideway internal surface is effectively prevented.

3 Claims, 2 Drawing Figures

CONVEYING APPARATUS FOR GRANULAR MATERIALS

This invention relates to an apparatus for conveying granular materials in general and, more particularly, animal food.

Conveying apparatus for granular materials are known in which a metal cable is slidably driven in a guideway: spaced-apart conveying members extend radially from the cable, these members being usually made of plastics material, and substantially mate the periphery of the guideway.

The guideway and the conveying members take different shapes: the most common shape is the tubular one, for example with a circular cross-section for the guideway and consequently the conveying members take the form of discs, which are moulded or otherwise applied onto the cable.

Mechanisms of this kind, even being extremely advantageous under many respects, may exhibit a few defects, especially when conveying granular materials having a comparatively large size. As a matter of fact, it occurs, during the forward motion of the cable, that granules of the material become wedged between the periphery of the discs and the internal surface of the tubular guideway: since the discs are virtually indeformable and are compelled to follow a well defined path, the granules which might have become wedged between their peripheries and the guideway are dragged by the cable in such a position even along a lenghty path and this fact originates considerable frictional forces which jam the regular sliding motion of the cable and stress in an abnormal manner the motive means which drive the cable.

An object of the present invention is to do away with these defects by providing an apparatus of the kind described above in which the wedging of granules of material between the disc periphery and the inner surface of the guideway is effectively prevented.

To this end, according to the invention, it has been envisaged to provide an apparatus in which the spaced-apart conveying members have the shape of tabs which extend from the cable alternately in angularly shifted directions.

In the case of tubular guideways having a circular cross-section, the tabs have, advantageously, the shape of circular sectors with a center angle of, for example, 45°, 90°, or 180°.

It is apparent that, with such a structure and such an arrangement of the tabs, should one or more granules of the material become wedged between a tab and the guideway, the cable is enabled to bend so as to set the granule free.

Figure 2:
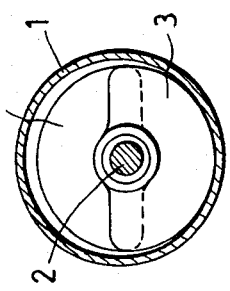

In order that the features of the invention may be better understood, an exemplary embodiment thereof will be described hereinafter with reference to the accompanying drawings, wherein:

FIG. 1 is a longitudinal cross-sectional view showing a portion of an apparatus constructed according to this invention, and FIG. 2 is a cross-sectional view taken along the line II—II of FIG. 1.

With reference to the drawings, 1 is a tubular metallic guideway, whose cross-section is circular and in which a metal cable 2 is driven to axial sliding motion by motive means not shown. To the cable 2 are applied spaced-apart conveying members for the material, which, according to the invention, have the form of tabs 3 which extend from the cable alternately in angularly shifted directions.

In the example shown, the tabs 3 have, each, a semicircular outline with a center angle of 180° and are alternately shifted from one another through 180°.

It is apparent from the drawings that, if one or more granules of the material should become wedged between the tab periphery and the inner surface of the guideway, the cable 3 is enabled to bend freely in the direction of the arrows, so that the locked-in granule is immediately disengaged.

The tabs 3 can be advantageously made of a plastics material and directly moulded onto the cable.

While a preferred embodiment of the invention has been described and shown, it will be understood that a few modifications can be introduced therein, for example the semicircular tabs can have centre angles and mutual angle shifts other than 180°: in addition the tubular guideway could have a cross-sectional shape other than circular and, if so, it is apparent that the tabs also should have a shape different from the one shown herein.

What is claimed is:

1. A conveying apparatus for granular materials comprising an enclosed guideway, a cable driven to slide within said guideway, and radially extending mutually spaced apart tab members on and normal to said cable substantially mating the peripheral outline of the guideway extending from the cable alternatingly in angularly shifted directions.

2. The apparatus according to claim 1, wherein said guideway is a tubular body having a circular cross-section and said tabs have the shape of circular sectors.

3. The apparatus according to claim 1, wherein said circular sectors have a center angle of 180° and are mutually angularly shifted through 180°.

* * * * *